US012244750B1

(12) United States Patent
Giazzon

(10) Patent No.: US 12,244,750 B1
(45) Date of Patent: Mar. 4, 2025

(54) TABLET CASE WITH LOCKING HIGH-FRICTION KICKSTAND

(71) Applicant: MAX Interactive, Inc., Irvine, CA (US)

(72) Inventor: Albert George Giazzon, Mesa, AZ (US)

(73) Assignee: MAX Interactive, Inc., Irvine, CA (US)

( * ) Notice: Subject to any disclaimer, the term of this patent is extended or adjusted under 35 U.S.C. 154(b) by 0 days.

(21) Appl. No.: 18/762,470

(22) Filed: Jul. 2, 2024

Related U.S. Application Data

(63) Continuation-in-part of application No. 18/631,395, filed on Apr. 10, 2024.

(51) Int. Cl.
 *H04M 1/04* (2006.01)

(52) U.S. Cl.
 CPC ..................... *H04M 1/04* (2013.01)

(58) Field of Classification Search
 CPC .................. H04M 1/04; H04M 1/06
 See application file for complete search history.

(56) References Cited

U.S. PATENT DOCUMENTS

| | | | |
|---|---|---|---|
| D695,287 S | 12/2013 | Chang et al. | |
| D733,154 S | 6/2015 | Armstrong et al. | |
| 9,215,916 B2 | 12/2015 | Kim | |
| D750,086 S | 2/2016 | Langhein | |
| 9,596,914 B2 | 3/2017 | Zaloom | |
| 9,936,780 B2 | 4/2018 | Tu et al. | |
| 10,459,484 B2 | 10/2019 | Ferren et al. | |
| D868,790 S | 12/2019 | Weng | |
| D897,349 S | 9/2020 | Li | |
| D902,935 S | 11/2020 | Li | |
| D904,414 S | 12/2020 | Hyun | |
| D924,877 S | 7/2021 | Weng | |
| D930,653 S | 9/2021 | Armstrong | |
| D935,468 S | 11/2021 | Li | |
| D936,060 S | 11/2021 | Zhang | |
| 2012/0024918 A1 | 2/2012 | DeCamp et al. | |
| 2015/0268700 A1 | 9/2015 | Olafsson | |
| 2018/0239399 A1 | 8/2018 | Nakada et al. | |
| 2019/0264867 A1* | 8/2019 | Dobson | F16B 47/00 |
| 2020/0359758 A1 | 11/2020 | Yuan | |
| 2023/0105321 A1* | 4/2023 | Carnevali | F16M 11/2021 248/451 |

OTHER PUBLICATIONS

Kim (KR 20230020122 A), Protection case for mobile phone, Feb. 2023, pp. 1-6 (Year: 2023).*
Felix et al. (KR 20170070737 A), Electronic device with standing unit, Jun. 2017, pp. 1-12 (Year: 2017).*

* cited by examiner

*Primary Examiner* — Keith Ferguson
(74) *Attorney, Agent, or Firm* — Eric Karich; Karich & Associates

(57) ABSTRACT

A tablet case includes a housing sized to receive the tablet computer, and a kickstand assembly that includes a locking high-friction hinge mounted on the housing. A kickstand member is attached to the high-friction hinge at a proximal end. The kickstand member is able to move between a collapsed configuration wherein the kickstand member abuts the housing, and at least one extended configuration wherein the kickstand member is axially rotated to extends outwardly from the housing for supporting the housing. Only friction from the locking high-friction hinge prevents axial rotation of the kickstand member.

2 Claims, 3 Drawing Sheets

TABLET CASE WITH LOCKING HIGH-FRICTION KICKSTAND

CROSS-REFERENCE TO RELATED APPLICATIONS

This application for a utility patent is a continuation of a previously filed utility patent application, still pending, having the application Ser. No. 18/631,395, filed Apr. 10, 2024.

BACKGROUND OF THE INVENTION

Field of the Invention

This invention relates generally to computer cases, and more particularly to a case adapted to receive a tablet computer, and having a kickstand for supporting the tablet computer.

Description of Related Art

The prior art teaches a variety of cases for tablet devices that include kickstands and other similar support structures for holding the tablet in an upright position for use.

Mody, U.S. Pat. No. 10,406,487 (Case-Mate, Inc.), teaches a case for an electronic device, which includes a support stand selectively extendable from a back panel, for supporting the electronic devices in vertical and/or horizontal orientations. The case requires an engagement feature to lock the arm in selected positions. Without the engagement feature, the kickstand would not support the weight of the electronic device in the case.

DeCamp, U.S. 2012/0024918, teaches a case for a portable electronic device that includes a hinge (FIGS. 3A and 3B) that is pivotally attached to the case. The hinge includes a rotation member coupled to and between the securement device and the base to allow the securement device to rotate in one or more directions relative to the base.

Vandiver, U.S. 2012/0006950, teaches a stand that includes a leg and a support member. The leg includes a hinge stop to arrest a pivoting of the leg when the leg pivots at a first hinge to a first angle relative to a rear surface of the display device. A second hinge at the distal portion of the leg pivotally attaches the support member to the leg, and a second hinge stop is adapted to arrest a pivoting of the support member when the support member pivots at the second hinge to a second angle relative to the leg.

Wang, U.S. Pat. No. 7,898,801, teaches a support assembly for a portable electronic device that includes: a support board, an elastic member, and two connecting sleeves slidably mounted to the support board and compressing the elastic member therebetween. The two connecting members are rotatably connected to the cover member.

Langhein, U.S. Pat. No. 9,826,075, teaches a protective case and a stand adapted to support the mobile electronic device in an easel-like fashion. The case includes first and second cases connected by a hinge, and with a relatively complex stand. A similar structure is shown in Chung, U.S. 2014/0291174.

The prior art teaches tablet cases that include a kickstand that includes some form of engagement feature to lock the kickstand in a selected position. However, the prior art does not teach a kickstand for a tablet case does not include an engagement feature, but instead includes high-friction hinges, where it is high friction from the hinges that prevents axial rotation of the kickstand relative to the case. The present invention fulfills these needs and provides further advantages as described in the following summary.

SUMMARY OF THE INVENTION

The present invention teaches certain benefits in construction and use which give rise to the objectives described below.

The present invention provides a tablet case for protecting a tablet computer and for supporting the tablet computer on a support surface. The tablet case includes a housing sized to receive the tablet computer, and a kickstand assembly that includes a locking high-friction hinge mounted on the housing. A kickstand member is attached to the high-friction hinge at a proximal end. The kickstand member is able to move between a collapsed configuration wherein the kickstand member abuts the housing, and at least one extended configuration wherein the kickstand member is axially rotated to extends outwardly from the housing for supporting the housing. Only friction from the locking high-friction hinge prevents axial rotation of the kickstand member.

A primary objective of the present invention is to provide a tablet case and kickstand having advantages not taught by the prior art.

Another objective is to provide a tablet case having a kickstand attached with locking high friction hinges for supporting the tablet case in any selected orientation, without the use of an engagement feature.

A further objective is to provide a tablet case and kickstand that is easy to use, and which can be adjusted to any desired angle, and is not restricted to certain pre-selected orientations.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a tablet case having a kickstand having a locking high-friction hinge for supporting the tablet case at a desired angle for viewing and use of a tablet computer mounted in the tablet case.

Figure 1:
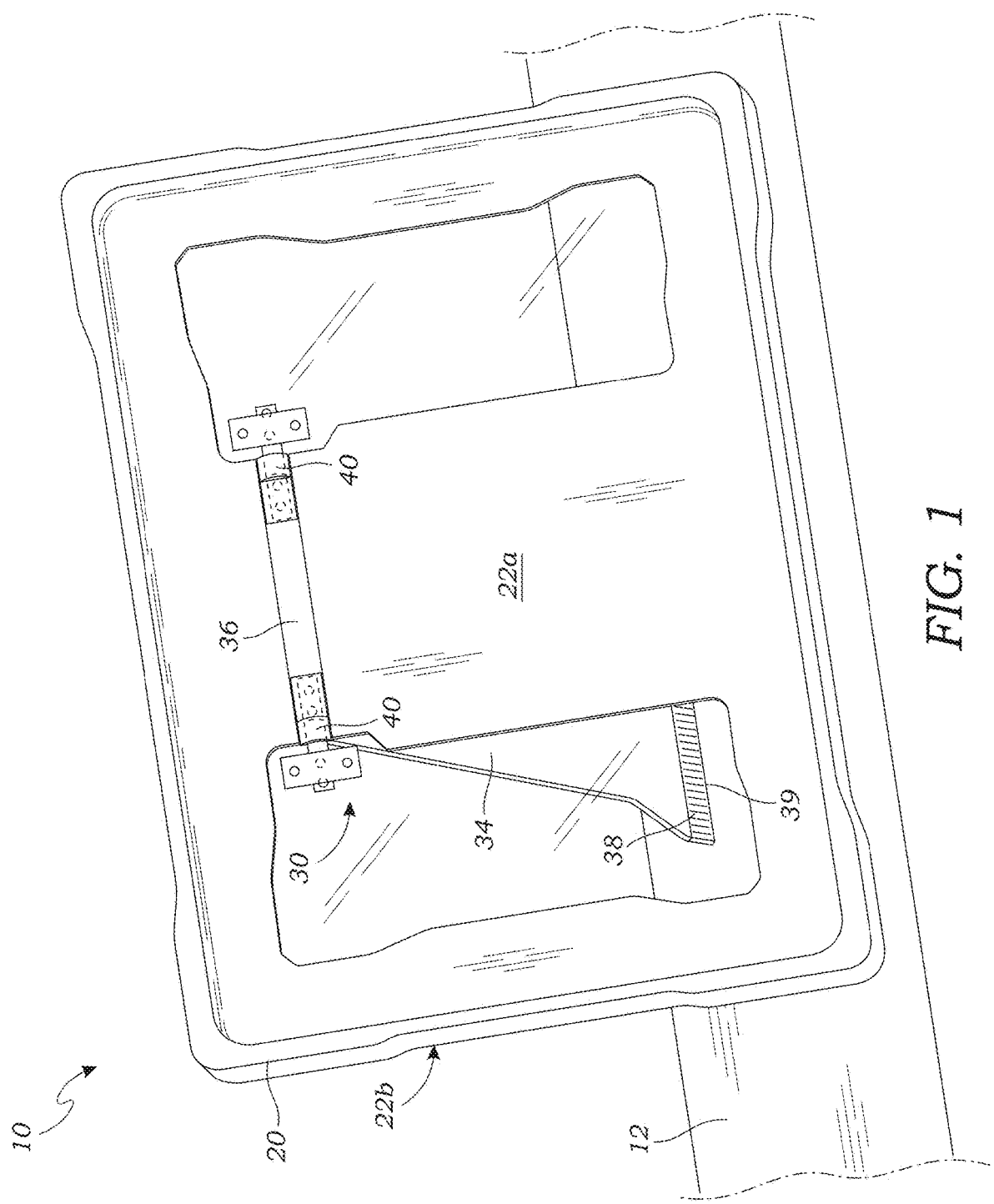
FIG. 1 is a perspective view of a tablet case according to one embodiment of the present invention, the view illustrating a kickstand assembly of the tablet case in a first extended configuration for supporting the tablet case on a support surface.

FIG. 1 is a perspective view of a tablet case 10 according to one embodiment of the present invention, the view illustrating a kickstand assembly 30 of the tablet case 10 in a first extended configuration for supporting the tablet case 10 on a support surface 12. As shown in FIG. 1, the tablet case 10 is adapted to protect a tablet computer (not shown) and for supporting the tablet computer on the support surface 12 (i.e., a table, countertop, desk, or similar).

As shown in FIG. 1, the tablet case 10 comprises a housing 20 sized to receive the tablet computer. As illustrated, the housing 20 comprises a front surface 22a and an opposed back surface 22b. A kickstand assembly 30 extends rearwardly adjacent the back surface 22b, and the front surface 22b contacts the tablet computer when it is installed within the housing 20. The housing 20 includes any form of curved edges, tabs, or other structures known in the art for holding the tablet computer on the housing 20. Since these structures are well known in the art, they are not discussed in greater detail herein.

The tablet case 10 is formed to afford protection from falls and environmental concerns, and may be adapted to receive the tablet computer or similar device, but in alternative embodiments may receive any form of smart phone, palm pilot, calculator, camera, or any other known or future device capable of functioning in conjunction with the tablet case 10 as described herein. In some embodiments, the tablet case 10 may additionally include any features typically associated with this type of protective case. For example, the housing 20 may include a screen (or transparent or translucent membrane) which may be touch screen compatible as is well known in the art. The tablet case 10 may further include portions which allow access to a front or rear camera lens, a "home" button, or any other features requiring screen access known to those skilled in the art. Other features may also be implemented, i.e., structures for mic/speakers/headphones, ornamental designs, cushioning and/or shock absorption features, etc., or any other associated features, which should be considered within the scope of the present invention. Because this type of device case is well known in the art, various associated structures of the claimed invention are not described further herein.

In some applications of the present invention, the housing 20 and/or kickstand assembly 30 may be formed of a rigid material such as polycarbonate, plastic, or any other suitable materials known in the art. In other embodiments, the housing 20 and/or kickstand assembly 30 of the tablet case 10 may be formed of a resilient material such as thermoplastic polyurethane (TPU), thermoplastic elastomer, or other suitable resilient material (e.g., silicone, soft plastic, rubber, etc.), or the tablet case 10 may be formed using a combination of rigid and resilient materials.

As illustrated in FIG. 1, the kickstand assembly 30 comprises a locking high-friction hinge 40 mounted on the housing 20 and attached to a proximal end 36 of a kickstand member 34 so that the kickstand member 34 is positioned adjacent the back surface 22b. In this embodiment, the kickstand member 34 is in the form of a planar support leg that extends from the proximal end 36 to a distal end 38. As shown in FIG. 1, the distal end 38 may include a bottom edge 39 that is shaped to rest upon the support surface 12, and which may widen to a width that is greater than the width of the proximal end 36, for better supporting the tablet case 10. However, the proximal and distal ends 36 and 38 may be approximately equal in width. The kickstand member 34 of this embodiment has a height that is between 50-90% of the height of the housing, in this case approximately 80% of the height.

For purposes of this application, the term "locking high-friction hinge" is defined to mean a hinge that provides enough resistance to prevent axial rotation of the hinge during standard use, with no other supports, engagement features, etc., but which can be rotated with a concerted effort by the user, without tools or extreme levels of force that are beyond the strength of an ordinary user.

It is critical in the present invention that the kickstand member is only attached to the housing via the high friction hinge, and there is no additional support member attached between the kickstand member and the housing.

Figure 2:
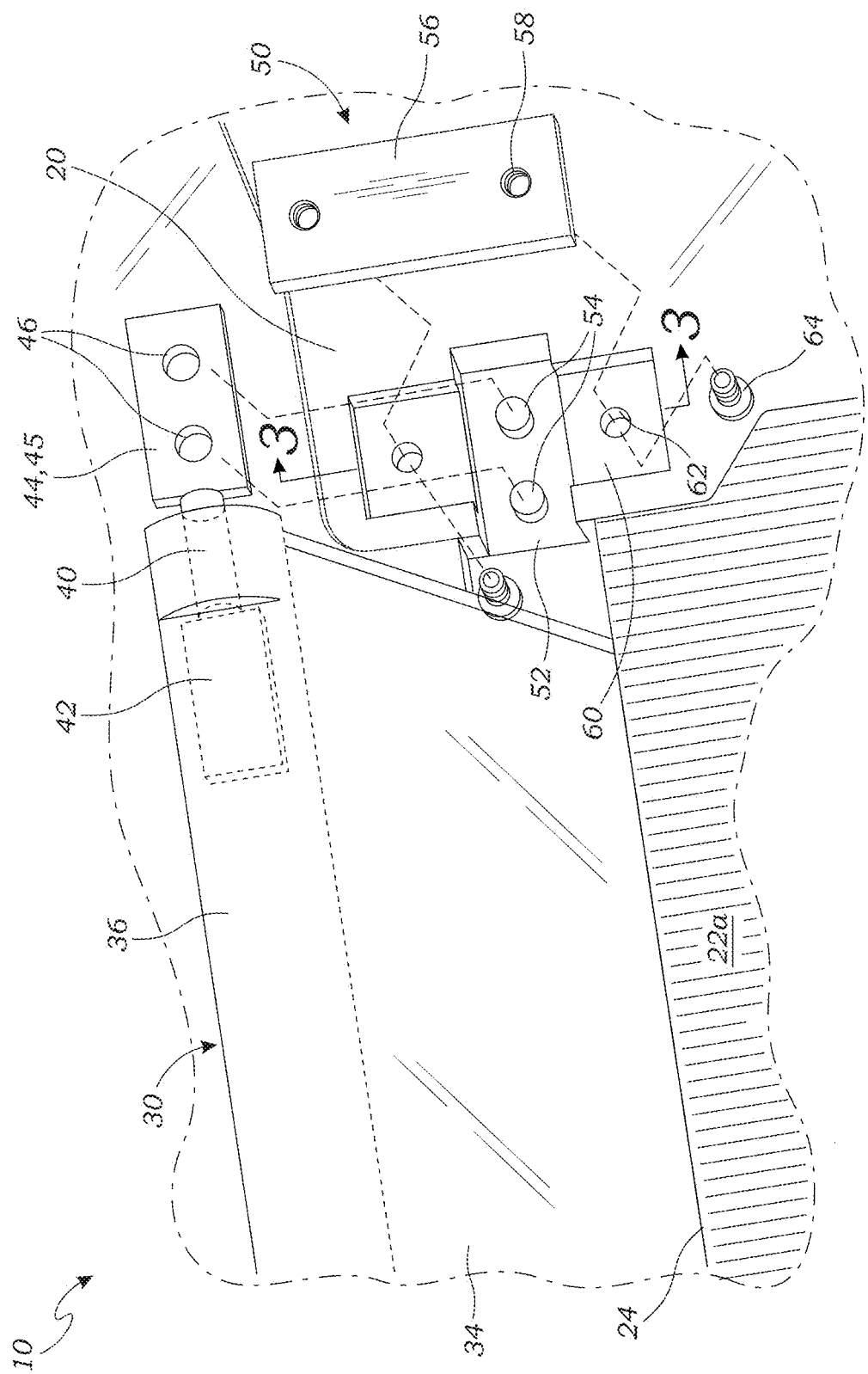
FIG. 2 is an up-close exploded view of a locking high-friction hinge of the kickstand assembly.
Figure 3:
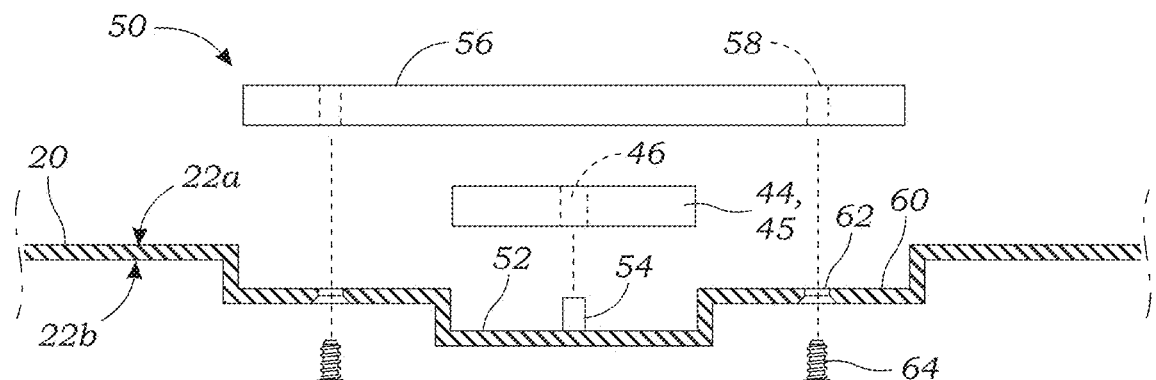
FIG. 3 is a sectional view thereof taken along line 3-3 in FIG. 2.

FIG. 2 is an up-close exploded view of a locking high-friction hinge 40 of the kickstand assembly 30. FIG. 3 is a sectional view of the tablet case 10 taken along line 3-3 in FIG. 2. As shown in FIGS. 2-3, in this embodiment, the locking high-friction hinge 40 includes a first end 42 and a second end 44 which rotate with respect to each other, but only against significant friction, as described above.

In this embodiment, the first end 42 is mounted to the proximal end 36 of the kickstand member 34, and the second end 44 is mounted to the housing 20.

As shown in FIGS. 2-3, in this embodiment the locking high-friction hinge 40 is attached at the first end 42 with a structure that is fixedly mounted within the proximal end 36 of the kickstand member 34 (e.g., molded, bonded, frictionally engaged, etc.) The second end 44, which is in the form of a mounting plate 45, engages a mounting mechanism 50 that attaches the mounting plate 45 to the housing 20. In this embodiment, the mounting plate 45 includes at least one bore 46 (in this case a pair of bores which extend entirely through the plate, but this is not required).

The mounting mechanism 50 of this embodiment includes a receiving recess 52 in the housing 20 (in this case in the front surface 22a) shaped to engage the mounting plate 45 of the locking high-friction hinge 40, and at least one locking post 54 extends upwardly from the receiving recess 52 to frictionally engage the at least one bore 46. In this embodiment, the mounting mechanism 50 further includes a locking plate 56 that is mounted to the housing 20 to cover the mounting plate 45, to lock the plate 45 within the receiving recess 52, thereby preventing rotation of the first end 44 of the locking high-friction hinge 40 relative to the housing 20.

The high-friction locking hinge 40 provides significantly higher resistance to axial rotation than standard hinges, such that the locking high-friction hinge 40 alone is able to prevent axial rotation of the hinge during standard use, and no other supports, engagement features, etc., are required for the kickstand to function and maintain the tablet case 10 in its desired orientation. Critically, prior art cases all require some form of engagement or locking feature to lock the kickstand in selected positions. By using only this locking high-friction hinge 40, other elements are removed as they are not required.

As shown in FIG. 3, in this embodiment, the housing 20 includes a channel 24 into which a proximal end 36 of the kickstand assembly 30 may be inserted, so that the kickstand is fastened on the front surface 22a but the kickstand extends out and over the back surface 22b. However, this is not necessarily required, and in alternative embodiments it may be mounted on the rear surface 22b, and/or attached using different mounting mechanisms.

Figure 4:
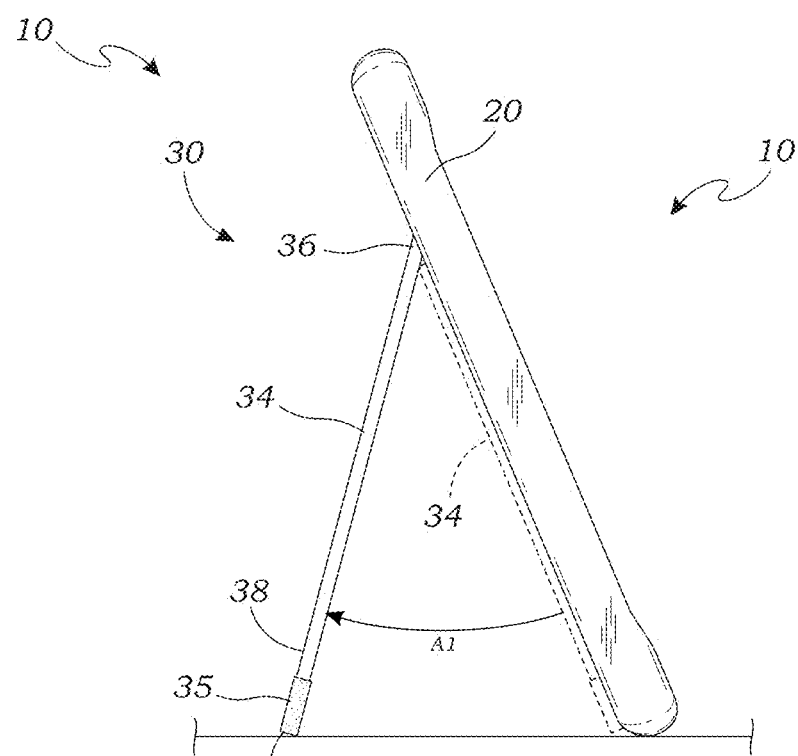
FIG. 4 is side elevational view of the tablet case of FIG. 1, showing the kickstand assembly being moved from a closed position to the first extended position.

FIG. 4 is side elevational view of the tablet case 10 of FIG. 1, showing the kickstand assembly 30 being moved from a closed position to the first extended position. In this example, the kickstand assembly 30 has been rotated to angle A1, which is in this case is about 30 degrees, although obviously any position may be selected, because it is adjusted by the friction of the hinge, and it is therefore not constrained to positions allowed by engagement elements, which are not included in this invention.

Figure 5:
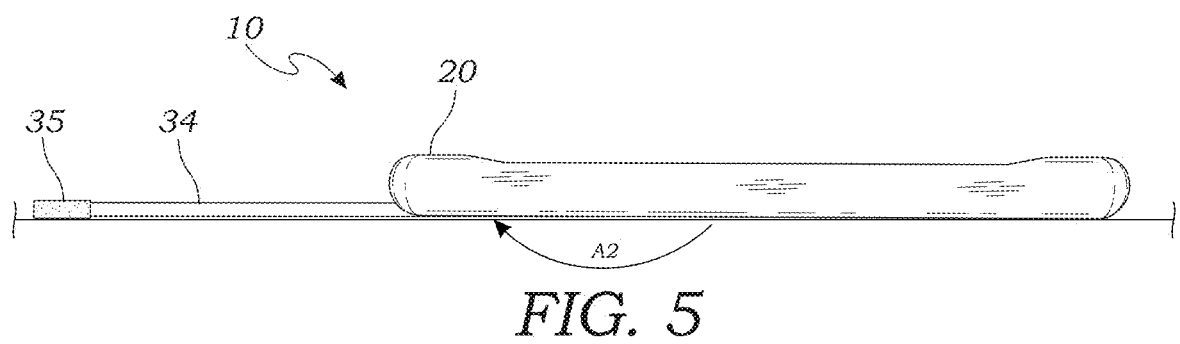
FIG. 5 is a side elevational view of the tablet case, showing the kickstand assembly in a second extended position.

FIG. 5 is a side elevational view of the tablet case 10, showing the kickstand assembly 30 in a second extended position, to angle A2. In this embodiment, A2 is about 180 degrees from the closed position adjacent the housing. This illustrated the great range of motion permitted by the current construction.

FIGS. 4-5 illustrate how the kickstand assembly 30 may be used to support the tablet case 10 (and thus a tablet computer in the case) at different angles for viewing and use. As shown, the kickstand member 34 is able to move between the closed, collapsed configuration wherein the kickstand member 34 is adjacent the housing 20, and at least one extended configuration wherein the kickstand member 34 extends outwardly from the housing 20 for supporting the housing 20, upon application of sufficient force to overcome the frictional resistance of the locking high-friction hinge 40. While two extended positions are illustrated, the nature of the locking high-friction hinge 40 means that the kickstand member 34 may be frictionally held at any angle between the collapsed configuration and the second extended position. Critically, it is only friction from the locking high-friction hinge 40 that prevents unwanted axial rotation of the kickstand member 34 between the collapsed configuration and the extended configuration. As shown in FIG. 5, the channel 27 in the back surface 22b may allow the kickstand member 34 to be recessed into the housing 20 when the kickstand assembly 30 is extended to its greatest angle A2.

Furthermore, as shown in FIGS. 1 and 4-5, the distal end 38 of the kickstand member 34 may include a rubber-like head 35. In some embodiments, the rubber-like head 35 is co-molded with the kickstand member 34, the remainder of which is constructed of plastic. However, in other embodiments, the distal end 38 may be formed of a different material, which may be any material that is adapted to frictionally engage the support surface 12. Alternatively, the distal end 38 may be constructed of the same material as the rest of the second member, wherein the rubber-like head 35 may be in the form of a cap that covers the distal end 38. The term "rubber-like" is defined to include rubber, rubber-like plastics and polymers, and other similar materials that are resilient, skid resistant with a suitably high coefficient of friction, and otherwise suitable as a support surface 12, according to the knowledge of a product designer skilled in the art.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A tablet case for protecting a tablet computer and for supporting the tablet computer on a support surface, the tablet case comprising:
    a housing sized to receive the tablet computer, the housing having a front surface and a back surface;
    a kickstand assembly comprising:
        a locking high-friction hinge that includes a first end mounted on the housing, and a second end, the first and second ends being rotatable with respect to each other; and
        a kickstand member extending from the proximal end to a distal end, wherein the second end of the high-friction hinge is attached to the proximal end of the kickstand member; and
    wherein the kickstand member is able to move between a collapsed configuration wherein the kickstand member abuts the housing, and at least one extended configuration wherein the kickstand member is axially rotated to extends outwardly from the housing for supporting the housing, upon application of sufficient force to overcome the frictional resistance of the locking high-friction hinge, and it is only friction from the locking high-friction hinge that prevents axial rotation of the kickstand member between the collapsed configuration and the extended configuration; and
    wherein the first end of the locking high-friction hinge includes a plate having at least one bore, and wherein the housing includes a receiving recess shaped to engage the plate of the locking high-friction hinge, and at least one locking post extends upwardly from the receiving recess to frictionally engage the at least one bore.

2. The tablet case of claim 1, further comprising a locking plate that is mounted to the housing to cover the plate, to lock the plate within a receiving recess, thereby preventing rotation of the first end of the locking high-friction hinge relative to the housing.

* * * * *